United States Patent [19]

Hamada

[11] Patent Number: 4,924,410
[45] Date of Patent: May 8, 1990

[54] DISPLAY CONTROL METHOD AND SYSTEM

[75] Inventor: Tatsuzo Hamada, Hatano, Japan

[73] Assignee: Hitachi, Ltd., Tokyo, Japan

[21] Appl. No.: 13,241

[22] Filed: Feb. 10, 1987

[30] Foreign Application Priority Data

Feb. 13, 1986 [JP] Japan .................................. 61-29524

[51] Int. Cl.⁵ ........................ G06K 3/00; G06F 15/40
[52] U.S. Cl. .................................. 364/518; 364/521; 340/747; 340/798
[58] Field of Search ........ 364/518, 521, 200 MS File; 340/717, 745, 720, 724, 814, 750, 726, 799, 798

[56] References Cited

U.S. PATENT DOCUMENTS

| | | | |
|---|---|---|---|
| 3,500,336 | 3/1970 | Cuccio | 340/814 |
| 3,961,324 | 6/1976 | Cousin et al. | 340/717 |
| 4,069,511 | 1/1978 | Lelke | 364/200 |
| 4,071,910 | 1/1978 | Stockebrand et al. | 364/900 |
| 4,071,911 | 1/1978 | Mazur | 364/900 |
| 4,161,777 | 7/1979 | Ying | 364/200 |
| 4,379,293 | 4/1983 | Boisvert et al. | 340/750 |
| 4,580,242 | 4/1986 | Suzuki et al. | 364/900 |
| 4,675,831 | 6/1987 | Ito et al. | 364/518 |
| 4,684,935 | 8/1987 | Fujisaku et al. | 340/717 |
| 4,695,966 | 9/1987 | Takakura et al. | 364/521 |
| 4,704,697 | 11/1987 | Kiremidjian et al. | 364/518 |
| 4,749,990 | 6/1988 | Birkner | 340/799 |
| 4,760,388 | 7/1988 | Tatsumi et al. | 340/717 |
| 4,812,998 | 3/1989 | Maeda | 364/518 |
| 4,823,286 | 4/1989 | Lumelsky et al. | 364/521 |

FOREIGN PATENT DOCUMENTS

| | | | |
|---|---|---|---|
| 0254226 | 12/1985 | Japan | 340/717 |
| 2147126 | 5/1985 | United Kingdom | 340/717 |

*Primary Examiner*—Gary V. Harkcom
*Assistant Examiner*—Phu K. Nguyen
*Attorney, Agent, or Firm*—Antonelli, Terry & Wands

[57] ABSTRACT

A display control system for controlling a plurality of display units and a method therefor. The display control system includes a pattern generator, and a plurality of bit map refresh memories equal in number to the display units. Input data are converted by the pattern generator to bit pattern information which is stored in the bit map refresh memory. The bit pattern information in the bit map refresh memory is read out repeatedly during time period corresponding to said display unit and is displayed on the corresponding display unit.

8 Claims, 5 Drawing Sheets

DISPLAY CONTROL METHOD AND SYSTEM

BACKGROUND OF THE INVENTION

1. Field of the Invention

The present invention relates to a display control method, for simultaneously controlling a plurality of display units, and to system therefor.

2. Description of the Prior Art

In the prior art, there is known a display control system for simultaneously controlling a plurality of display units by time sharing one character generator among the display units, as is disclosed in Japanese Patent Laid-Open No. 25035/1982, for example. According to the display control system of this kind, a number of display units can be controlled in principle by one pattern generator (which is a general name given to a character generator, a graphic pattern generator, a vector generator and so on). In order to obtain a display screen of high quality, the number of display units, simultaneously controlled by one pattern generator, is in practice limited to two at the most.

Figure 4:
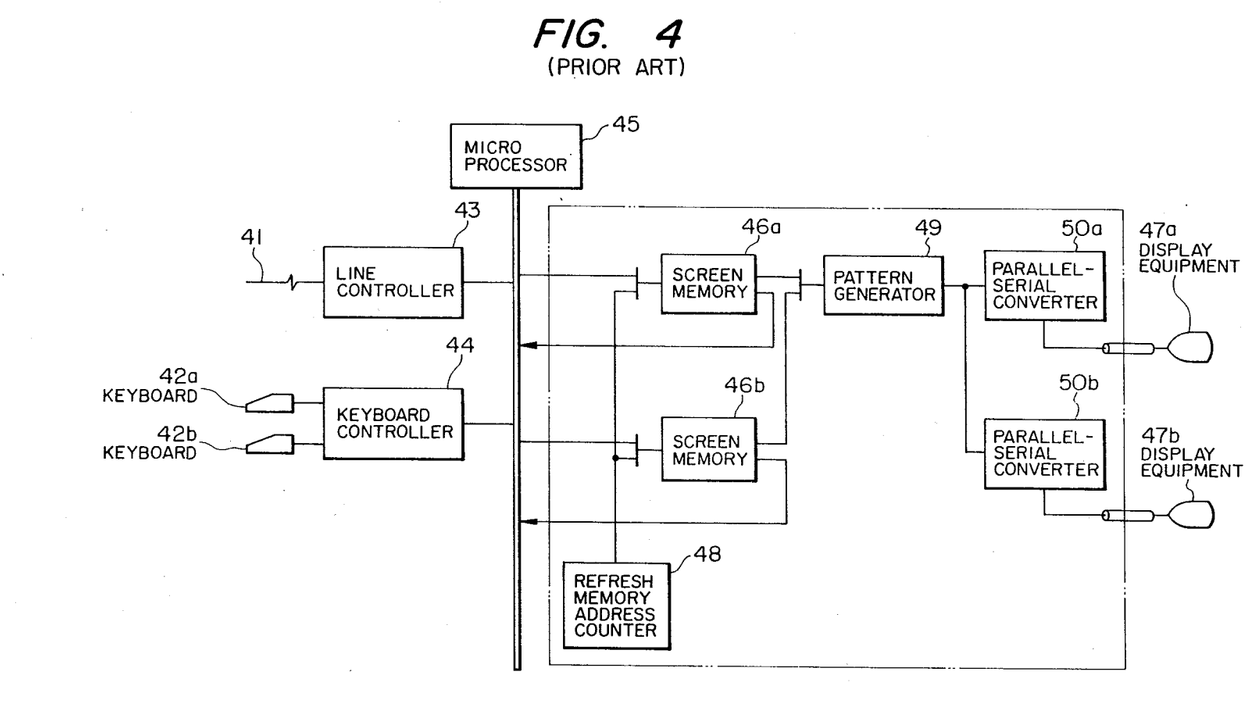
FIG. 4 is a block diagram showing the structure of the display control system of the prior art for simultaneously controlling two display units with one pattern generator.

FIG. 4 is a block diagram showing one example of the display control system of the prior art for simultaneously controlling two display units by one pattern generator.

In FIG. 4, the display control system of the prior art is generally structured of: a line controller 43 for controlling the input/output information on a line 41; a keyboard controller 44 for controlling input information from keyboards 42 (i.e., 42a and 42b); screen memories 46 (i.e., 46a and 46b) provided one-to-one to display units 47 (i.e., 47a and 47b) for storing the display information of the display units 47 in letter codes; a refresh memory address counter 48 for reading and controlling the display information of the screen memories 46 in synchronism with the scanning timing of the display units 47; a pattern generator 49 for converting the display information stored by the screen memories 46 into letter patterns; parallel-serial converters 50 (i.e., 50a and 50b) for parallel-serially converting the letter pattern data read out from the pattern generator 49 and sending them to the display units 47; and a microprocessor 45 for controlling the above-recited circuits.

The operation of the display control system thus structured according to the prior art is not described in detail because it is well known in the art. The problems encountered by the display control system of the prior art will be described in the following in case three or more display units are to be controlled by one pattern generator.

Figure 5:
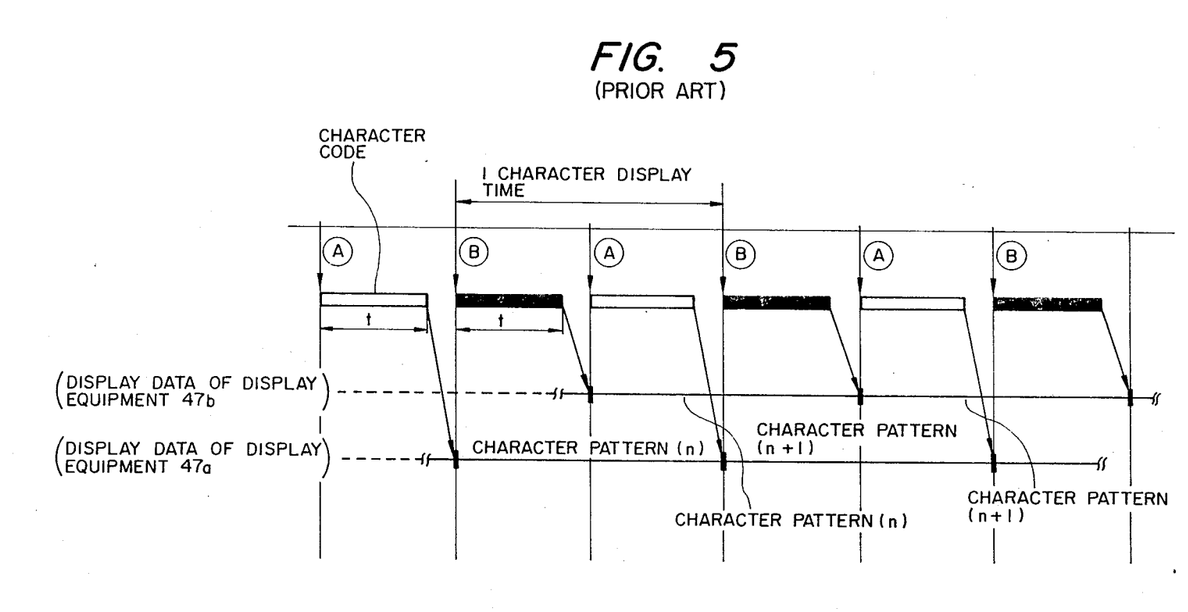
FIG. 5 is a timing chart showing the case in which the pattern generator of FIG. 4 is to be controlled by time sharing.

FIG. 5 is a timing chart for the case in which the pattern generator 49 is to be controlled for time sharing. FIG. 5 also shows a timing chart for the case in which two display devices are to be controlled. The display data of the display unit 47a reads out the display information of the screen memory 46a at the timing B of a one-letter display time T. In response to the display information, the pattern generator 49 reads out a letter pattern corresponding to said display information. This means that it takes a time t to access the screen memory 46a and the pattern generator 49.

Likewise, the display data of the display unit 47b is started at the timing A of the one-letter display time T to similarly read out the letter pattern.

From the operations described above, it is concluded that display units, n in number, can be controlled by sharing the one-letter display time T by n. Let the case be considered, in which RAMs and a ROM are used as the screen memories 46a and 46b and the pattern generator 49, respectively, in such general CRT display unit.

The one-letter display time T is calculated by the following equation:

$$T = \frac{\left(\frac{1}{\text{Horizontal Scanning Frequency}}\right) \times \left(\begin{array}{l}\text{Ratio of Display Time to} \\ \text{Horizontal Scanning Time}\end{array}\right)}{\text{Number of Display Letters in Horizontal Direction}}$$

$$= \frac{\left(\frac{1}{15.75 \times 10^3}\right) \times 0.6}{80}$$

$$= 470 \text{ ns}$$

If the access times of the RAMs and the ROM are set at 150 ns and 80 ns, respectively, the time t is calculated by the following equation:

$$\begin{aligned} t &= (\text{Access Time of Display Memories}) + \\ &\quad (\text{Access Time of Pattern Generator}) \\ &= 150 + 80 \\ &= 230 \text{ (ns)} \end{aligned}$$

Next, because $T > nt$, $$n < T/t = 470/230$$

$$\therefore n < 2.04$$

Generally speaking, therefore, it will be understood that one pattern generator can control two display devices at the most.

In the display control system of the prior art, therefore, the number of display units which can be controlled by one pattern generator is two at the most, and more pattern generators are required if the number of the display units increases.

On the other hand, as the information to be displayed in the display units becomes finer and finer, to include the English figures, the Kana or Japanese alphabet, the Kanji or Chinese letters, and graphs, the pattern generator naturally becomes complicated and expensive.

SUMMARY OF THE INVENTION

An object of the present invention is to provide a display control system which is enabled to control a plurality of display units with one pattern generator without any deterioration in the display screen and without the one pattern generator becoming more complicated and expensive as the display content becomes finer to include Kanji and a graph.

According to the present invention, there is provided a display control system for controlling a plurality of display units, which system comprises: a line control unit (or an input control unit) for controlling data from a communication line (or an input unit); one pattern generator connected with said line control unit (or said input control unit) via the data bus of a microprocessor; and a plurality of bit map refresh memories connected with the output terminal of said pattern generator, whereby the problems of the prior art are solved by connecting a plurality of corresponding display units with said bit map refresh memories.

When the data of the display control system are applied from the communication line or the input unit, these input data, as they are or after having been edited, are converted by the pattern generator, in groups of one or more letters, into dot information corresponding to a letter or graph and are then expanded into the bit map refresh memories. The dot information of these bit map refresh memories is read out repeatedly for a time period corresponding to that of the display units, each of which is structured as a display medium such as a CRT or a liquid crystal element and its control circuit, and are displayed in said display units. As a result, only one pattern generator is sufficient for the plural display units, and no flicker (in the screen) is generated even if the frequency of repetitions of the display screen drops.

DESCRIPTION OF THE PREFERRED EMBODIMENTS

One embodiment of the present invention will be described in detail in the following with reference to the accompanying drawings.

Figure 1:
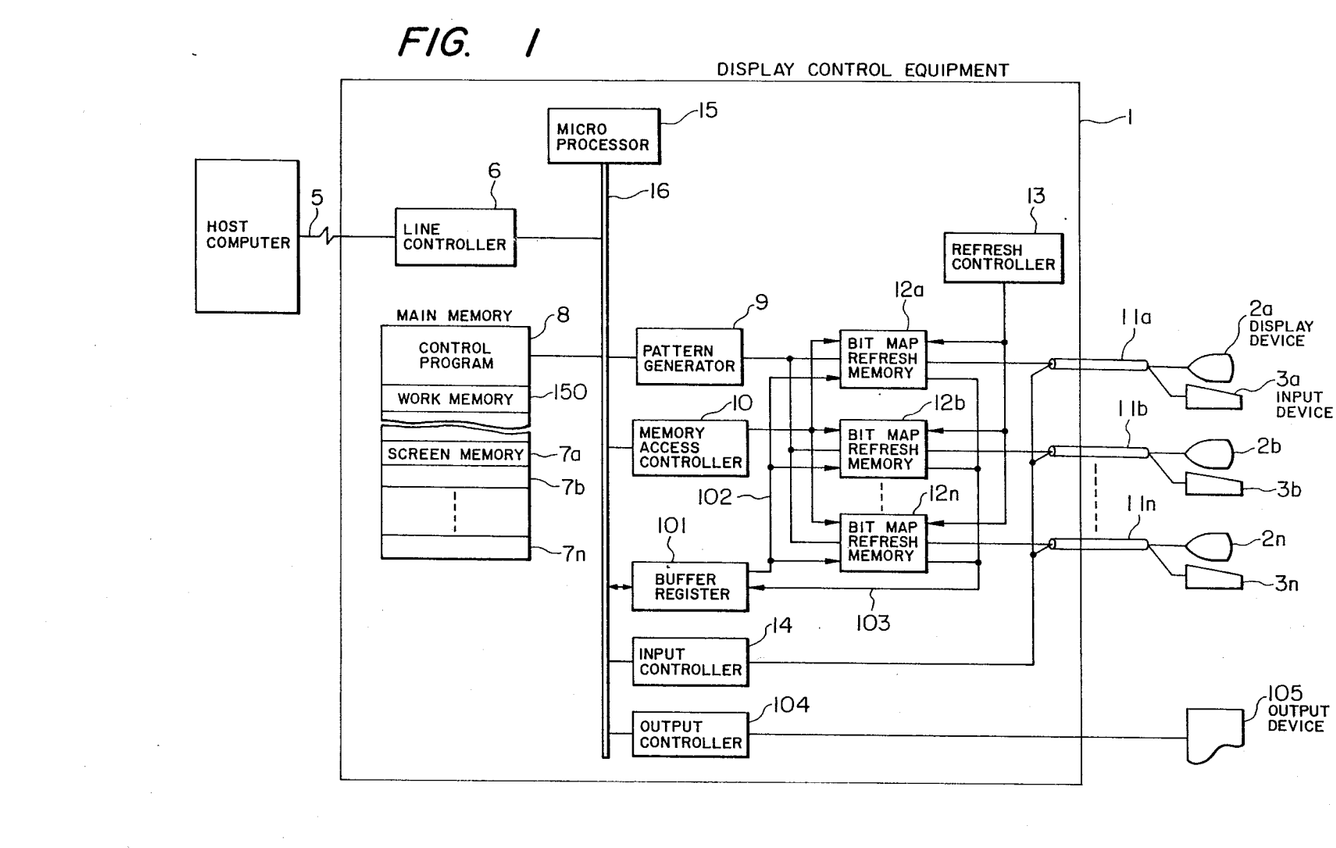
FIG. 1 is a block diagram showing the structure of one embodiment of the display control system of the present invention.

FIG. 1 is a block diagram showing the embodiment of the present invention.

In FIG. 1, a display control system 1 is connected with a plurality of display units 2a, 2b, - - -, and 2n to be controlled via cables 11a, 11b, - - -, and 11n. The display units 2a, 2b, - - -, and 2n are equipped with input units 3a, 3b, - - -, and 3n such as keyboards. The display control system 1 is structured of: a line control unit 6 for controlling the communication of data with a host computer connected via a communication line 5; a main memory 8 composed of a control program, a variety of registers, a work memory 150 and screen memories 7a, 7b, - - -, and 7n corresponding to the display units 2a, 2b, - - -, and 2n; a pattern generator 9 for converting coded information into letter dot patterns such as English figures, Kana or Kanji, or a graph pattern; a memory access control circuit 10 for controlling the main memory 8 and the pattern generator 9; a refresh control 13 for refresh-controlling bit map refresh memories 12 (i.e., 12a, 12b, - - -, and 12n) which correspond to the display units 2a, 2b, - - -, and 2n and which store the respective display contents of said display units in dot information; a keyboard control 14 for controlling input information from the input units 3a, 3b, - - -, and 3n; a microprocessor 15 for conducting a screen editing process in accordance with a control program; and a data/address/control bus 16.

The input information from the host computer is applied to the line control unit 6 via the communication line 5. Moreover, the input units 3a, 3b, - - -, and 3n are sequentially under polling control by the keyboard control 14 so that they introduce input information into the keyboard control 14 when an input unit having that input information is selected. When the data of the input information are applied to the line control equipment 6 or the keyboard control 14, the microprocessor 15 discriminates whether the data require no editing and are displayed at the rate of one letter in a screen or require editing.

This discrimination of whether or not editing is necessary is conducted either to sequentially display the applied data as they are in the display unit under consideration or not to display them as they are because they are compressed so as to increase the efficiency of the transmission line.

If the applied data are in the former case, in accordance with the applied data, the content of the screen memory 7i (i=a, b, - - -, and n) corresponding to the display unit 2i under consideration is renewed, and the code information is converted into pattern information by the pattern generator 9 and is expanded into dots in the bit map refresh memory 12i corresponding to that display unit 2i. In the latter case of the applied data, these data are stored in a work memory 150 belonging to the main memory 8 and are edited by the microprocessor 15 in accordance with the control program. In accordance with the data thus edited, the content of the screen memory 7i corresponding to the display unit 2i under consideration is renewed, and the code information is converted into pattern information by the pattern generator 9 and are expanded into dots in the bit map refresh memory 12i corresponding to that display unit 2i.

Next, the operation to convert the code information into the pattern information and to display it in the display unit 2i will be described in the following.

The memory access control circuit 10 sequentially reads out the input data by the well-known method of the direct memory 150 access from either the work memory, which is operative to store the code information stored in the main memory 8 and reedited, or the buffer memory of the line control equipment 6 or the keyboard control 14, and applies them to the pattern generator 9. In this generator 9, the code information or the input data are converted into the corresponding pattern information. The pattern information is written by the memory access control circuit 10 according to the direct memory access method in the bit map refresh memory 12i corresponding to the display unit 2i under consideration. The dot information stored in the bit map refresh memory 12i is read out repeatedly in synchronism with the necessary refresh period of the display unit 2i, which is composed of the display medium such as a cathode ray tube of a liquid crystal panel and its drive circuit, and is transmitted via the cable 11i to the display unit 2i under consideration so that it is displayed as a letter or graph on the display screen of the display unit 2i.

Figure 6:
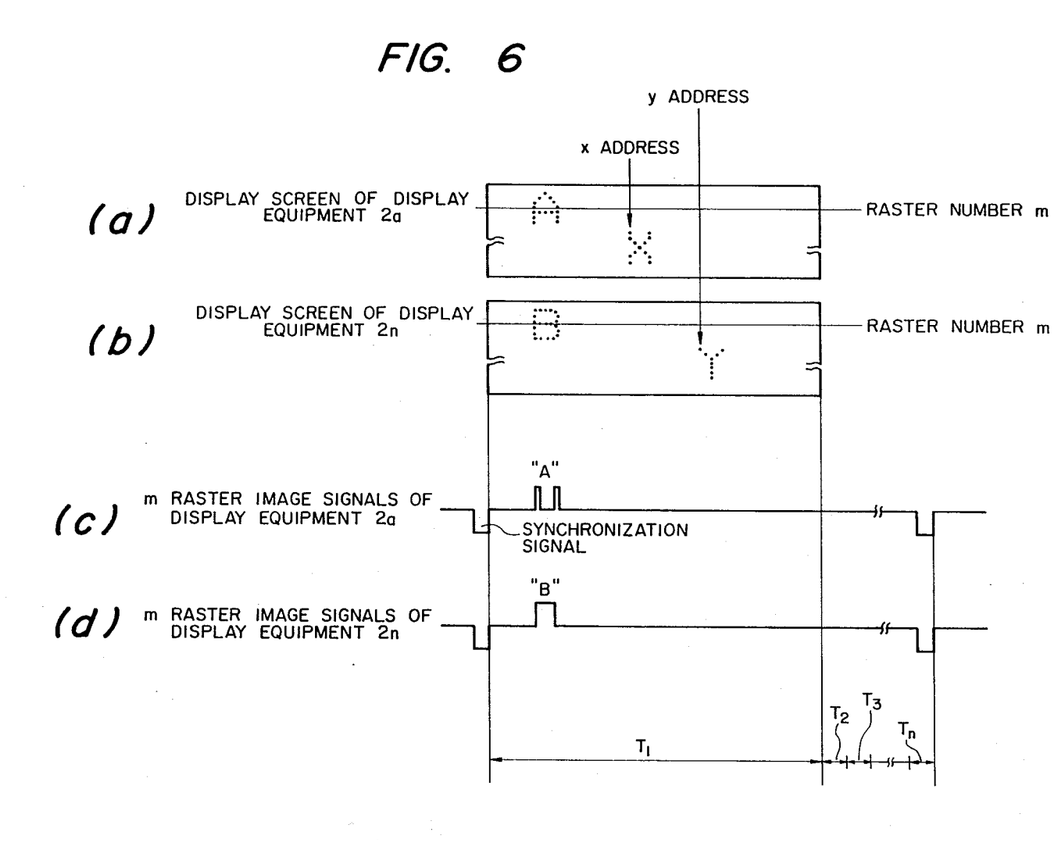
FIG. 6 is a diagram for explaining the timing of the access to the pattern generator of the present invention.

FIG. 6 contains diagrams for explaining the timing at which the code information is converted into the pattern information and written from the pattern generator 9 into the plural bit map refresh memories 12a to 12n, and the timing at which the pattern information stored in the bit map refresh memories is read out in synchronism with the refresh periods of the display units 2a to 2n.

In the case in which the display units 2a to 2n are cathode ray tubes, the timing chart of the period, for which the electron beam scans the raster number m of the display screen of the display unit 2a is the video signal of the luster number m of the display unit 2a, as shown in FIG. 6(c). Here, the negative polarity indicates a synchronizing signal, and the positive polarity indicates a video signal corresponding to the video waveform of the fourth raster line of the English letter "A" in FIG. 6(a).

The display unit 2n is also scanned in synchronism with the display unit 2a, and the video signal of the raster number m of its display screen is shown in FIG. 6(d).

A time $T_1$ designates a video signal period (or a display period), and times $T_2$ to $T_n$ designate the non-display periods containing the fly-back time of the electron beam. Now, in the case in which an English letter "X" is displayed at an address x of the display screen of the display unit 2a after it has been transmitted from the line 5 via the line control equipment 6, as shown in FIG. 6(a), the code information on the English letter "X" is applied during the timing of the time period $T_1$ or the non-display period under the control of the microprocessor 15 to the pattern generator 9, and the pattern information or the output of the pattern generator 9 is written into the bit map refresh memory 2a by expanding the display pattern of the English letter "X" from the start of the address x. Next, in the case in which the code information is applied from the line 5 or the input unit 2n to display an English letter "Y" at an address y of the display screen of the display unit 2n, as shown in FIG. 6(b), the code information on the English letter "Y" is applied during the timing of the time period $T_3$ under the control of the microprocessor 15, and the pattern information or the output of the pattern generator 9 is written into the bit map refresh memory 2n by starting the expansion of the display pattern of the English letter "Y" from the address y. In case the inputs to the display units 2a and 2n occur simultaneously, which input is prior is controlled by the microprocessor 15, and the code information is applied in the order of priority so that the pattern information is written in the bit map refresh memory under consideration.

The pattern information on the bit map refresh memories 12a to 12n is simultaneously read out for the period of the time $T_1$ in synchronism with the refresh periods of the display units 2a to 2n.

It is assumed for simplicity of explanation in FIG. 6 that the scanning timings of the display units 2a to 2n are synchronized, but this synchronization is not absolutely necessary. Moreover, the pattern information applied from the pattern generator 9 is written in the non-display periods $T_2$ to $T_n$. However, the pattern information can be written in the bit map refresh memories 12a to 12n even in the display period $T_1$.

Furthermore, the screen memories 7i need not always operate at a higher speed than the bit map refresh memory 12i which operates at a high speed in synchronism with the refresh period of the display unit 2i. Since, furthermore, the read/write operations are conducted only under the control of the microprocessor 15, the screen memories 7i may form part of the main memory 8.

Here, the main memory 8 contains the control program, the screen memories 7i and the work memory 150, as shown in FIG. 1. As has been described hereinbefore, the control program is one for controlling the display control system as a whole, and the work memory 150 is used for temporarily storing the data or control information in case the data are to be edited, for example.

On the other hand, the information to be stored in the screen memory 7i is required in case the screen data are to be sent to the host computer or in case an arbitrary portion of an old screen is to be edited in accordance with the input data by inserting or deleting the data, for example. In case the data applied by the input unit 3i or the display screen data of the display unit 2i are to be sent to the host computer, for example, the information to be stored in the screen memory 7i corresponding to the display unit 2i is sent under the control of the line control equipment 6.

In case the information to be displayed in the display unit 2 is only the received information, the display screen data naturally need not be sent to the host computer so that the code information corresponding to the display screen need not be stored. Even if the received data are those requiring the editing, on the other hand, the data required for the data editing or the control information can be temporarily stored in the work memory of the main memory rather than in the screen memory 7. Then, the screen memory 7 can be dispensed with. For example, a system which is required to have functions to receive vector commands or letter data from the host computer and to display them merely on the screen of the display unit 2 need not have the screen memory 7. On the other hand, in a system, in which the display screen of the display unit 2 is divided into and displayed in a receiving area for displaying the data from the host computer and a sending area for displaying and monitoring the input data from the input unit 3 and in which only the data of the sending area are sent to the host computer, the screen memory 7 may be equipped with a memory having the capacity of the sending area of the display unit 2 under consideration.

Figure 2:
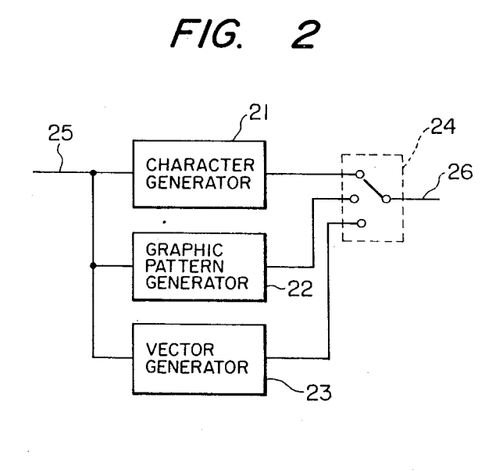
FIG. 2 is a block diagram showing an example of the structure of a pattern generator of FIG. 1.

FIG. 2 is a block diagram showing one example of the structure of the pattern generator 9 shown in FIG. 1. As shown, the pattern generator 9 is structured of: a character generator (CG) 21 for storing a dot font pattern such as an English letter, the Kana or the Kanji; a graphic pattern generator 22 for storing picture element pattern information corresponding to graphic codes; a vector generator 23 for generating line element pattern information on a straight line or curve in response to a vector command; and a switch 24 for switching those generators. When data are applied to an input terminal 25 connected with the data bus 16, the character generator 21, the graphic pattern generator 22 or the vector generator 23 operates in accordance with the kind of data to apply the pattern information corresponding to the input data through the switch 24 to an output terminal 26 connected with the bit map refresh memory 12.

Figure 3:
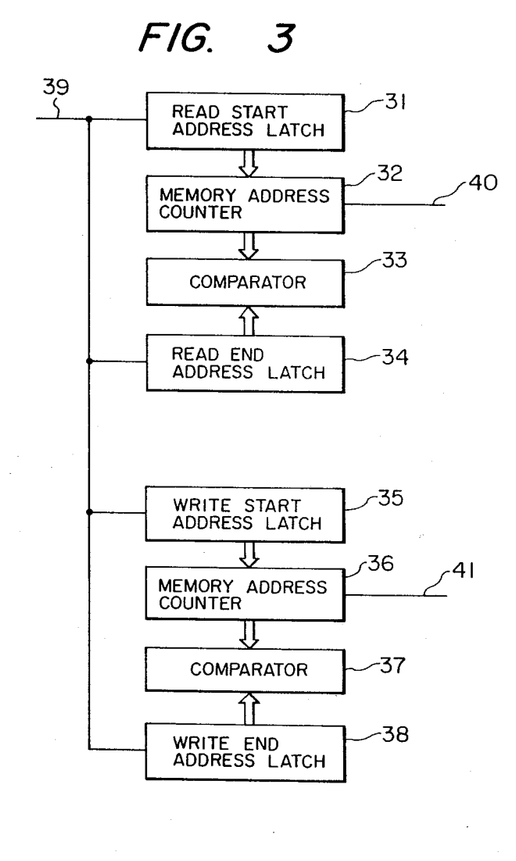
FIG. 3 is a block diagram showing an example of the structure of a memory access control circuit of FIG. 1.

FIG. 3 shows an example of the structure of the memory access control circuit 10 shown in FIG. 1.

First of all, the function of reading out the data by the direct access method from the work memory 150 in the main memory 8 for once storing the reedited code information, the circuit control equipment 6, or the buffer memory (which will be shortly referred to as the "screen buffer") belonging to an input control unit such as the keyboard control 14 will be described in the following. This function can be performed by: a screen buffer read start address latch circuit 31 for latching the read start address of the screen buffer; a screen buffer read end address latch circuit 34 for latching the read end address of the screen buffer; a screen buffer memory address counter 32 for indicating the read memory address of the screen buffer; and a comparator 33 for detecting the coincidence between the content of the screen buffer read end address latch circuit 34 and the content of the screen buffer memory address counter 32.

When data are applied to the screen buffer, the read start address and the read end address of the screen buffer are set under the control of the microcomputer 15 in the screen buffer read start address latch circuit 31 and the screen buffer read end address latch circuit 34, respectively, via an input terminal 39 connected with the control bus 16. When the read start is then made, the address value stored in the read start address latch circuit 31 is set in the screen buffer memory address counter 32, the output terminal 40 of which indicates the read address of the screen buffer. Subsequently, each time one letter is read out from the screen buffer, the counted value of the screen buffer memory address counter 32 is incremented by 1. When the counted value of the screen buffer memory address counter 32 reaches the address value stored in the screen buffer read end address latch circuit 34, the reading operation of the screen buffer is ended by generating a read end signal from the comparator 33.

Next, the function of writing the pattern information in the bit map refresh memory 12 corresponding to the display unit 2 under consideration by the direct access method will be described in the following. This function is performed by: a bit map refresh memory write start address latch circuit 35 for storing the write start address of the bit map refresh memory 12; a bit map refresh memory write end address latch circuit 38 for storing the write end address of the bit map refresh memory 12; a bit map memory address counter 36 for indicating the write address of the bit map refresh memory 12; and a comparator 37 for detecting the coincidence between the content of the bit map memory write end address latch circuit 38 and the content of the bit map memory address counter 36. These operations are similar to those of the aforementioned case in which the data are to be read out from the screen buffer.

Now, with reference to FIG. 1, the display screen data of the display unit 2 are printed either at the unit of a screen or partially by the following manner.

The pattern information on the screen to be displayed in the display unit 2i is stored in the corresponding bit map refresh memory 12i. Under the control of the microcomputer 15, the pattern information on an arbitrarily designated address is read out from the bit map refresh memory 12i by the memory access control circuit 10, and the output information is temporarily stored as print information in a buffer register 101 via an output terminal 103. The print information is sent via the data bus 16 and an output control 104, such as a hard copy control, to an output unit 105 so that it is printed.

Incidentally, the pattern information of the bit map refresh memory 12i is usually written in through the pattern generator 9, but the whole portion or an arbitrarily designated portion of the stored content of the bit map refresh memory 12i can be rewritten not through the pattern generator 9.

For example, in case a mouse is used as the input unit so that an arbitrary line drawing is applied to the display screen of the display unit 2, positional information applied from the input unit 3 is converted into the memory address of the bit map refresh memory 12i under consideration by the microprocessor 15 and is written in the bit map refresh memory 12 via the buffer register 101 and a control line 102 so that the arbitrary line drawing can be displayed directly on the display unit 2.

As is now apparent from the description thus far made, according to the present invention, it is possible to control the display of a plurality of display units with one pattern generator without that pattern generator becoming more complicated and expensive as the information to be displayed in the display units becomes finer to include English letters, Kana letters, Kanji letters and a graph. Moreover, the screen memories do not require any high-speed memory element but can be incorporated into the main memory to simplify the display control system.

What is claimed is:

1. A display control system for controlling displays on a plurality of display units, said control system comprising:
   input means for receiving coded information representative of a plurality of displays to be generated;
   a plurality of screen memories equal in number to the number of displays to be generated;
   a work memory;
   first control means responsive to the format of received coded information for applying received coded information having a first format to a selected one of said plurality of screen memories for storage therein, the selected one of said plurality of screen memories being associated with the display unit on which the display represented by that coded information is to be generated, and applying received coded information having a second format to said work memory for storage therein;
   editing means for editing coded information stored in said work memory and applying the edited coded information to said selected one of said plurality of screen memories for storage therein;
   a pattern generator connected to said screen memories for converting the coded information stored therein into bit pattern information;
   a plurality of bit map memories equal in number to the number of displays to be generated, each bit map memory storing as a bit map the bit pattern information of the display to be generated on a corresponding one of the plurality of display units;
   second control means for controlling application of the bit pattern information from said pattern generating means to said bit map memories; and
   third control means for controlling application of the stored bit pattern information from each of said bit map memories to the corresponding one of the plurality of display units to generate a display thereon.

2. A display control system according to claim 1, wherein said pattern generating means includes a character generator.

3. A display control system according to claim 1, wherein said third control means includes means for reading out the stored bit pattern information from each of said bit map memories repeatedly during time periods corresponding to said display units, respectively.

4. A display control system according to claim 1, further comprising a buffer register for storing the contents of one of said bit map memories for subsequent application to a printer for printing thereof.

5. A display control system according to claim 1 wherein said pattern generating means includes a graphic pattern generator.

6. A display control system according to claim 1 wherein said pattern generating means includes a vector generator.

7. A method of controlling displays in a display system including a plurality of display units, said method comprising:

receiving coded information representative of a plurality of displays to be generated on a plurality of display units equal in number to the number of displays to be generated;

storing received coded information having a first format in a selected one of a plurality of screen memories equal in number to the number of displays to be generated, the selected screen memory being associated with the display unit on which the display represented by that received coded information is to be generated;

storing received coded information having a second format in a work memory;

editing coded information stored in said work memory;

storing the edited coded information in said selected one of said plurality of screen memories;

converting the coded information stored in said plurality of screen memories into bit pattern information for the plurality of display units;

storing the bit pattern information for each of the display units in a corresponding bit map memory; and     reading the stored bit pattern information from each of the bit map memories to the corresponding one of the display units to generate displays thereon.

8. A display control method according to claim 7, wherein said reading step includes reading out the stored bit pattern information from each of said bit map memories repeatedly during time periods corresponding respectively to said corresponding display units.

* * * * *